United States Patent
Binek et al.

(10) Patent No.: US 12,044,409 B2
(45) Date of Patent: Jul. 23, 2024

(54) CASING INTEGRATED FLUID DISTRIBUTION SYSTEM

(71) Applicant: Raytheon Technologies Corporation, Farmington, CT (US)

(72) Inventors: Lawrence A. Binek, Glastonbury, CT (US); Jesse R. Boyer, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 309 days.

(21) Appl. No.: 16/577,537

(22) Filed: Sep. 20, 2019

(65) Prior Publication Data

US 2021/0088215 A1 Mar. 25, 2021

(51) Int. Cl.
| | |
|---|---|
| *F23R 3/28* | (2006.01) |
| *B22F 5/00* | (2006.01) |
| *B22F 10/38* | (2021.01) |
| *F02C 7/22* | (2006.01) |
| *F23R 3/34* | (2006.01) |
| *B33Y 80/00* | (2015.01) |

(52) U.S. Cl.
CPC .............. *F23R 3/283* (2013.01); *B22F 5/008* (2013.01); *B22F 5/009* (2013.01); *B22F 10/38* (2021.01); *F02C 7/222* (2013.01); *F23R 3/28* (2013.01); *F23R 3/346* (2013.01); *B33Y 80/00* (2014.12); *F05D 2220/80* (2013.01)

(58) Field of Classification Search
CPC .. F23R 3/28; F23R 3/283; F23R 3/286; F23R 3/346; F02C 7/222; B33Y 80/00; Y02T 50/60; B22F 5/008; B22F 5/009; B22F 10/38; F05D 2220/80; F05D 2230/30
See application file for complete search history.

(56) References Cited

U.S. PATENT DOCUMENTS

| | | | | |
|---|---|---|---|---|
| 3,827,638 A | * | 8/1974 | Halvorsen | F23R 3/28 239/533.13 |
| 4,229,944 A | * | 10/1980 | Weiler | F23R 3/005 60/39.511 |
| 4,312,185 A | * | 1/1982 | Nash | F23C 5/00 60/739 |
| 4,897,994 A | * | 2/1990 | Shekleton | F02C 7/26 60/778 |

(Continued)

FOREIGN PATENT DOCUMENTS

| | | |
|---|---|---|
| EP | 3663563 A1 | 6/2020 |
| EP | 3730765 A1 | 10/2020 |

(Continued)

OTHER PUBLICATIONS

Great Britain Search Report for GB Application No. 2014569.4, Dated Mar. 12, 2021, pp. 6.

(Continued)

*Primary Examiner* — Loren C Edwards
(74) *Attorney, Agent, or Firm* — Getz Balich LLC

(57) ABSTRACT

An additively manufactured attritable engine includes an engine case, a fuel ring integral and conformal with the engine case, and a fuel manifold attached to the fuel ring and configured to deliver fuel to the fuel ring. The engine also includes a fuel injector attached to the fuel ring and configured to receive fuel from the fuel ring.

10 Claims, 2 Drawing Sheets

(56) References Cited

U.S. PATENT DOCUMENTS

| | | | | |
|---|---|---|---|---|
| 4,938,020 A * | 7/1990 | Shekleton | ............... | F23R 3/04 60/743 |
| 5,211,005 A * | 5/1993 | Hovnanian | ............ | F02C 7/222 60/800 |
| 5,241,818 A * | 9/1993 | Shekleton | ............... | F23R 3/28 60/738 |
| 5,727,378 A * | 3/1998 | Seymour | ............... | F02C 3/09 60/804 |
| 8,393,154 B2 | 3/2013 | Gandza | | |
| 8,806,871 B2 | 8/2014 | McMasters et al. | | |
| 9,765,972 B2 | 9/2017 | Zink | | |
| 9,784,187 B2 | 10/2017 | Wolfe et al. | | |
| 10,352,569 B2 | 7/2019 | Boardman et al. | | |
| 2006/0218925 A1 * | 10/2006 | Prociw | ............... | F23K 5/06 60/740 |
| 2010/0192581 A1 * | 8/2010 | Ziminsky | ............... | F23R 3/34 60/737 |
| 2011/0173983 A1 * | 7/2011 | Pinson | ............... | F23R 3/286 60/742 |
| 2012/0234010 A1 * | 9/2012 | Bottcher | ............... | F23R 3/283 60/737 |
| 2016/0273453 A1 * | 9/2016 | Frish | ............... | F23R 3/283 |
| 2017/0342846 A1 * | 11/2017 | Chen | ............... | F01D 9/023 |
| 2018/0128490 A1 | 5/2018 | Boardman et al. | | |

FOREIGN PATENT DOCUMENTS

| | | |
|---|---|---|
| EP | 3754170 A1 | 12/2020 |
| WO | WO 2018005106 A1 | 1/2018 |

OTHER PUBLICATIONS

Great Britain Exam Report for GB Application No. GB2014569.4, Dated Oct. 29, 2021, pp. 4.

* cited by examiner

CASING INTEGRATED FLUID DISTRIBUTION SYSTEM

BACKGROUND

The present disclosure relates generally to attritable aircraft engines. More specifically, this disclosure relates to cooling a fluid dispensing system within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fuel dispensing system within a traditional aircraft engine, which can have more than 30 individual parts, each requiring assembly. Even in the realm of attritable engines, conventional fuel rails can have more than 10 individual parts, which need to be brazed together, which is expensive and time consuming.

Furthermore, conventional fluid dispensing devices may be heavy, are difficult to package, and because of the many operating parts may be expensive to maintain and/or repair. There exist needs in various industries to reduce the number of manufactured parts for fluid dispensing devices, thereby providing more robust and simpler designs, which requires less maintenance, reduces manufacturing time and costs, reduces weight, and simplifies packaging.

SUMMARY

An additively manufactured attritable engine includes an engine case, a fuel ring integral and conformal with the engine case, and a fuel manifold attached to the fuel ring and configured to deliver fuel to the fuel ring. The engine also includes a fuel injector attached to the fuel ring and configured to receive fuel from the fuel ring.

A method of additively manufacturing an attritable engine lubrication system includes manufacturing an engine case, a fuel ring integral and conformal with an engine case, and a fuel manifold attached to the fuel ring and configured to deliver fuel to the fuel ring. The method also includes manufacturing a fuel injector attached to the fuel ring and configured to receive fuel from the fuel ring.

DETAILED DESCRIPTION

An attritable engine with an integrally built fuel dispensing system is disclosed herein. The attritable engine leverages additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

Figure 1:
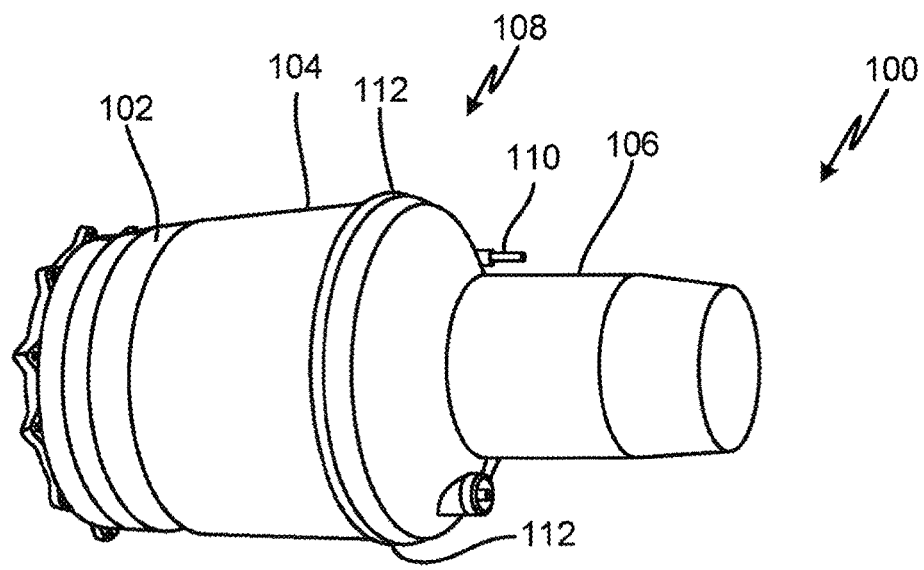
FIG. 1 is a perspective view of an attritable engine with an integrated fuel ring.

FIG. 1 is a perspective view of an attritable engine with an integrated fuel ring. FIG. 1 shows attritable engine 100 including forward engine casing 102, rearward engine casing 104, exhaust casing 106, fluid distribution system 108, fuel manifold 110, and fuel ring 112. Forward engine casing 102 encases a compressor section of attritable engine 100 and is connected to rearward engine casing 104, which encases combustion and turbine sections of attritable engine 100. Exhaust casing 106 is connected to rearward engine casing 104, opposing forward engine casing 102.

Rearward engine casing 104 has fluid distribution system 108 including fuel manifold 110 and fuel ring 112. Fuel manifold 110 is coupled to a fluid source such as a fuel tank. Fuel manifold 110 is configured to deliver fuel to fuel ring 112, which is formed integral and conformal with rearward engine casing 104. Fuel ring 112 travels circumferentially around engine casing 104 and can deliver fuel at multiple sites along the circumferential path.

Figure 2:
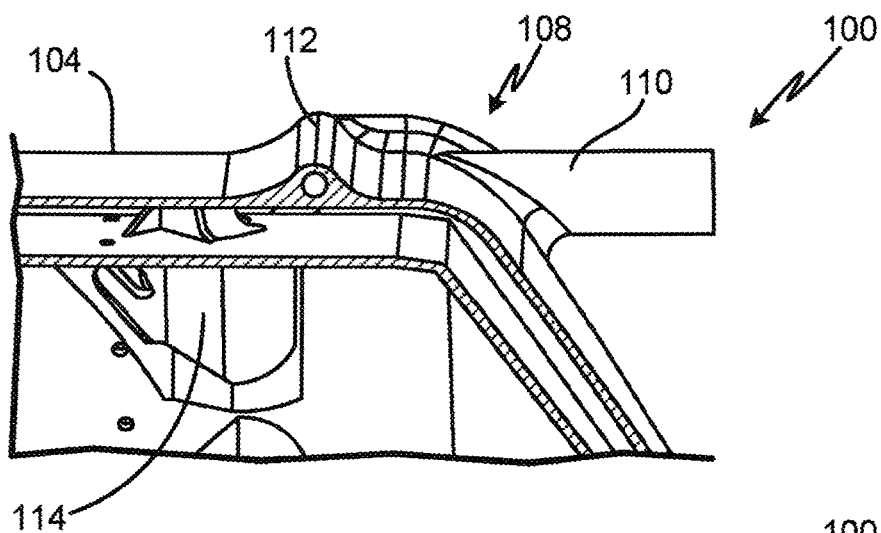
FIG. 2 is a first cross-sectional view of an attritable engine with an integrated fuel ring.

FIG. 2 is a first cross-sectional view of an attritable engine with an integrated fuel ring. FIG. 2 shows attritable engine 100 including rearward engine casing 104, fluid distribution system 108, fuel manifold 110, fuel ring 112, and combustor 114. Rearward engine casing 104 has fluid distribution system 108 including fuel manifold 110 and fuel ring 112. Fuel manifold 110 is coupled to a fluid source such as a fuel tank. Fuel manifold 110 is configured to deliver fuel to fuel ring 112, which is formed integral and conformal with rearward engine casing 104.

The fuel exits fuel ring 112 and enters fuel injector 116 (shown in FIG. 3), which delivers the fuel to combustor 114. The fuel can be aerated by air from an air channel prior to delivery into combustor 114, aerated in combustor 114, or aerated both prior to and during delivery to combustor 114. Combusted fuel enters the turbine section and exits out of attritable engine through exhaust casing 106.

Figure 3:
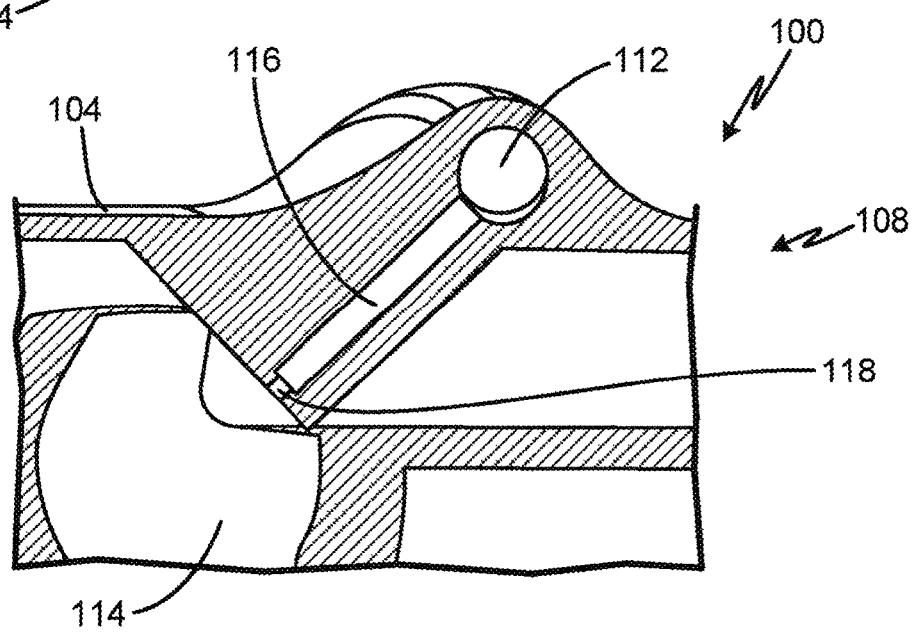
FIG. 3 is a second cross-sectional view of an attritable engine with an integrated fuel ring.

FIG. 3 is a second cross-sectional view of an attritable engine with an integrated fuel ring. FIG. 3 shows attritable engine 100 including rearward engine casing 104, fluid distribution system 108, fuel ring 112, combustor 114, fuel injector 116, and fuel injector outlet 118.

Fuel injector 116 is attached to fuel ring 112 and can form a "T-junction". Fuel injector 116 extends at an acute angle from rearward engine casing 104 in an axial direction toward the central rotor's rotational axis. Fuel ring 112 extends circumferentially around the central rotor's rotational axis and is integral and conformal with rearward engine casing 104. Fuel ring 112 is configured to deliver fuel to fuel injector 116. The fuel travels through fuel injector 116 and exits through fuel injector outlet 118 and enters combustor 114. Fuel injector outlet 118 helps to ensure that fuel does not stagnate in fuel injector 116. Stagnate fuel that remains in the fluid distribution system too long may reach the fuel's flashpoint, posing a mission critical hazard.

Although only one injector is depicted in FIG. 3, attritable engine 100 can include more than one injector such as, for example, two, six, twelve, sixteen, twenty-four, thirty, thirty-two or any number there between. In some embodiments, attritable engine 100 can include more than thirty-two injectors.

Attritable engine 100 can be additively manufactured using techniques such as laser powder bed fusion, electron beam melting, and binder jetting. The additive manufacturing process can use any metal or alloy that can tolerate the high temperature and pressure environment of a gas turbine engine for the expected useable life of the vehicle, such as, for example, nickel based alloys like Inconel® 625, copper, and ceramic based materials. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

The overall payload of the vehicle is considered when defining the engine case and fuel rail geometries. For example, a missile or UAV can be much smaller and lighter compared to a traditional piloted aircraft. As such, the attritable engine length, measured from the primary air inlet to the primary air exhaust port, can be from 8 in. (20.3 cm) to 36 in. (91.4 cm) in length. The attritable engine length can be from 10 in. (25.4 cm) to 24 in. (61.0 cm) in length. The attritable engine length can be from 14 in. (35.6 cm) to 18 in. (45.7 cm) in length.

For further example, the outer diameter of the attritable engine around the rearward engine case can be about 21 in. (53.3 cm). The outer diameter can be from 19 in. (48.3 cm) to 23 in. (58.4 cm), inclusive. The outer diameter can be from 17 in. (43.2 cm) to 25 in. (63.5 cm), inclusive. In some embodiments, the outer diameter can be less than 17 in. (43.2 cm). In some embodiments, the outer diameter can be more than 25 in. (63.5 cm).

For further example, the inner diameter of the fuel ring can be about 0.093 in. (2.36 mm). The inner diameter can be from 0.089 in. (2.26 mm) to 0.097 in. (2.46 mm), inclusive. The inner diameter can be from 0.083 in. (2.11 mm) to 0.103 in. (2.62 mm), inclusive. In some embodiments, the inner diameter can be less than 0.083 in. (2.11 mm). In some embodiments, the inner diameter can be more than 0.103 in. (2.62 mm).

Figure 4:
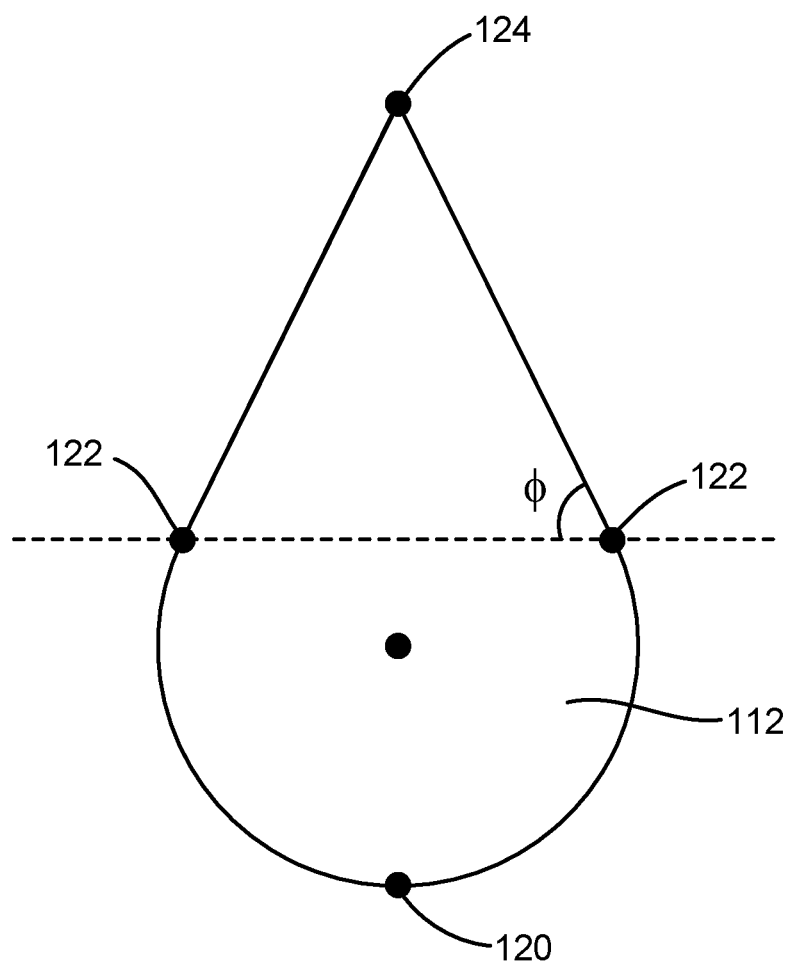
FIG. 4 is a cross-sectional view of a fuel ring having a tear-drop shape.

Additionally, although the fuel ring is depicted in FIGS. 2 and 3 as having a substantially circular shape, the fuel ring can also have an elliptical or tear-drop shape. Considerations such as flow rate and ease of manufacturing are used to determine the final size and geometry of the fuel ring. FIG. 4 is a cross-sectional view of a fuel ring having a tear-drop shape. FIG. 4 shows fuel ring 112 including reference points 120, 122, 124, reference angle Φ, and reference plane X.

For example, additive manufacturing builds the rearward engine casing in a layer-by-layer process and defining an annular passage integral and conformal within the rearward engine case may be stronger if the annular passage such as the fuel ring has a tear-drop shape compared to a circular shape. Shapes which require a feature to have less than a 45 degree build angle, such as a circular feature, may not build properly because the feature may not be adequately supported. As such, building the annular passage having a tear-drop shape allows the build angle to be 45 degrees or more throughout the build process of the annular passage.

Operationally, the additive manufacturing process begins at reference point 120 and continues stepwise by adding, in a layer-by-layer process, the surrounding structure of the fuel ring and forming the circular portion of the tear-drop shape until reaching references points 122. Reference plane X transects reference points 122. Reference angle Φ represents the angle between two adjacent points along wall of fuel ring 112 and reference plane X. At reference points 122, reference angle Φ is substantially 45 degrees. Manufacturing proceeds from reference points 122 and maintains reference angle Φ (the angle between two adjacent points along wall of the fuel ring and a reference plane), which can also be called the build angle, at substantially 45 degrees until the tear-drop shape is completed at reference point 124. In some embodiments, reference angle Φ is greater than 45 degrees. In some embodiments, reference angle Φ is less than 45 degrees, however, as the reference angle approaches zero, the structure becomes less stable and is influenced by other factors such as, for example, the length of the structure being built. In other words, short structures built having large reference angles results in a stronger build with a lower build failure rate compared to longer structures having smaller reference angles.

Additively manufacturing an attritable engine with an integrated fuel ring saves significant time and expense to the overall manufacturing process. Additive manufacturing reduces the number of parts needing to be assembled while maintaining many complex performance enhancing features as these features are built integrally with the engine case rather than added as separate parts during the assembly process.

Discussion of Possible Embodiments

The following are non-exclusive descriptions of possible embodiments of the present invention.

An additively manufactured attritable engine includes an engine case, a fuel ring integral and conformal with the engine case, and a fuel manifold attached to the fuel ring and configured to deliver fuel to the fuel ring. The engine also includes a fuel injector attached to the fuel ring and configured to receive fuel from the fuel ring.

The engine of the preceding paragraph can optionally include, additionally and/or alternatively, any one or more of the following features, configurations and/or additional components:

The fuel ring is formed of nickel or nickel based alloy.
The fuel ring has an annular shape.
The fuel ring has a tear-drop shape.
The fuel ring has an inner diameter from 0.083 in. (2.11 mm) to 0.103 in. (2.62 mm), inclusive.
The fuel ring has an inner diameter from 0.089 in. (2.26 mm) to 0.097 in. (2.46 mm), inclusive.
The engine includes 6 fuel injectors.
The engine case, the fuel manifold, the fuel injector, and the fuel ring are manufactured using additive manufacturing techniques.
A build angle used during the additive manufacturing process is maintained at substantially 45 degrees or greater.

A method of additively manufacturing an attritable engine lubrication system includes manufacturing an engine case, a fuel ring integral and conformal with an engine case, and a fuel manifold attached to the fuel ring and configured to deliver fuel to the fuel ring. The method also includes manufacturing a fuel injector attached to the fuel ring and configured to receive fuel from the fuel ring.

The method of the preceding paragraph can optionally include, additionally and/or alternatively, any one or more of the following features, configurations and/or additional components:

The fuel ring is formed of nickel or nickel based alloy.
The fuel ring has an annular shape.
The fuel ring has a tear-drop shape.
The fuel ring has an inner diameter from 0.083 in. (2.11 mm) to 0.103 in. (2.62 mm), inclusive.

The fuel ring has an inner diameter from 0.089 in. (2.26 mm) to 0.097 in. (2.46 mm), inclusive.

The engine includes 6 fuel injectors.

The engine case, the fuel manifold, the fuel injector, and the fuel ring are manufactured using additive manufacturing techniques.

A build angle used during the additive manufacturing process is maintained at substantially 45 degrees or greater.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine, comprising:
    an engine case;
    a fuel ring integral with the engine case;
    a fuel manifold attached to the fuel ring; and
    a fuel injector attached to the fuel ring and configured to receive fuel from the fuel manifold through the fuel ring, the fuel injector comprising a fuel injector bore within the fuel injector;
    the fuel injector bore extending from the fuel ring to a fuel injector outlet disposed at a terminating end of the fuel injector;
    the fuel injector bore having a lateral fuel injector bore width; and
    the fuel injector outlet having a lateral outlet width that is less than the lateral fuel injector bore width;
    wherein the fuel ring has an elliptical cross-sectional shape or a tear-drop cross-sectional shape;
    wherein the fuel injector bore has a circular cross-sectional shape;
    wherein the fuel ring has the tear-drop cross-sectional shape, and the tear-drop cross-sectional shape includes a circular section, a first straight section and a second straight section;
    wherein the circular section extends circumferentially about a center axis of the circular section from a first end of the first straight section to a first end of the second straight section; and
    wherein a second end of the first straight section and a second end of the second straight section meet at a point.

2. The engine of claim 1, wherein
    a reference plane extends through a point at the first end of the first straight section and a point at the first end of the second straight section; and
    the first straight section is angularly offset from the reference plane by forty-five degrees.

3. The engine of claim 1, wherein the fuel injector bore extends within the fuel injector along a centerline that is angularly offset from a central axis of the engine by a non-zero acute angle.

4. The engine of claim 1, wherein the fuel injector is attached to the fuel ring such that the fuel injector and the fuel ring form a T-junction.

5. The engine of claim 4, wherein the T-junction is situated such that the fuel injector has the circular cross-sectional shape at the T-junction.

6. The engine of claim 4, wherein the fuel injector is attached at the T-junction such that the fuel injector has an attachment cross-section that is smaller than a fuel ring cross-section at the T-junction.

7. The engine of claim 1, wherein the fuel injector has the circular cross-sectional shape at the fuel injector outlet.

8. The engine of claim 7, wherein the fuel injector has the circular cross-sectional shape along an entirety of the fuel injector.

9. The engine of claim 1, wherein the fuel injector is integral with the fuel ring and the engine case.

10. The engine of claim 9, wherein the fuel injector, the fuel ring and the engine case all comprise one of a nickel-based alloy, copper, or a ceramic material.

* * * * *